May 23, 1933.　　　O. SHACKELFORD　　　1,911,093
STACKER FOR GLASSWARE ANNEALING LEERS
Filed Feb. 16, 1932　　　8 Sheets-Sheet 2
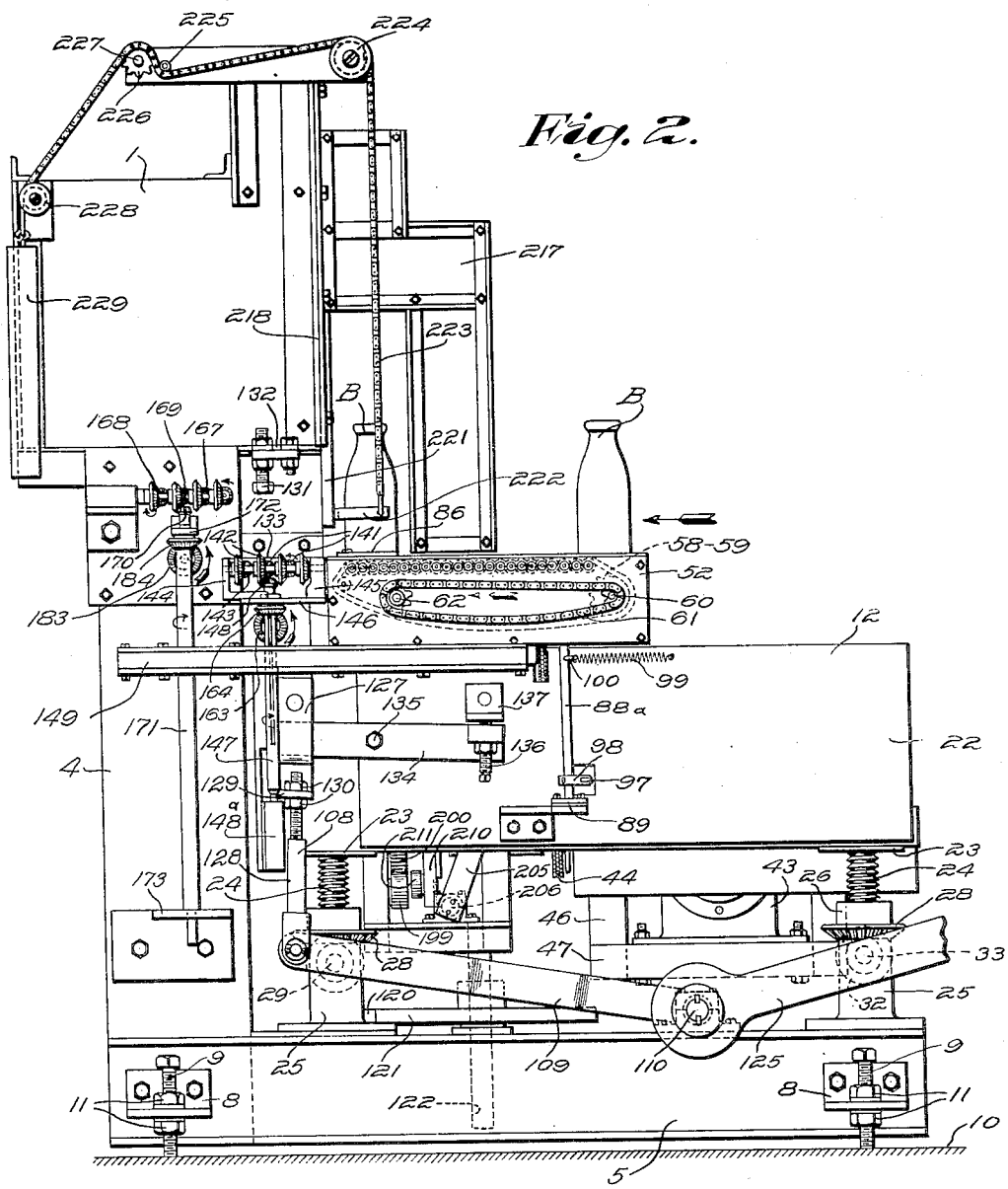

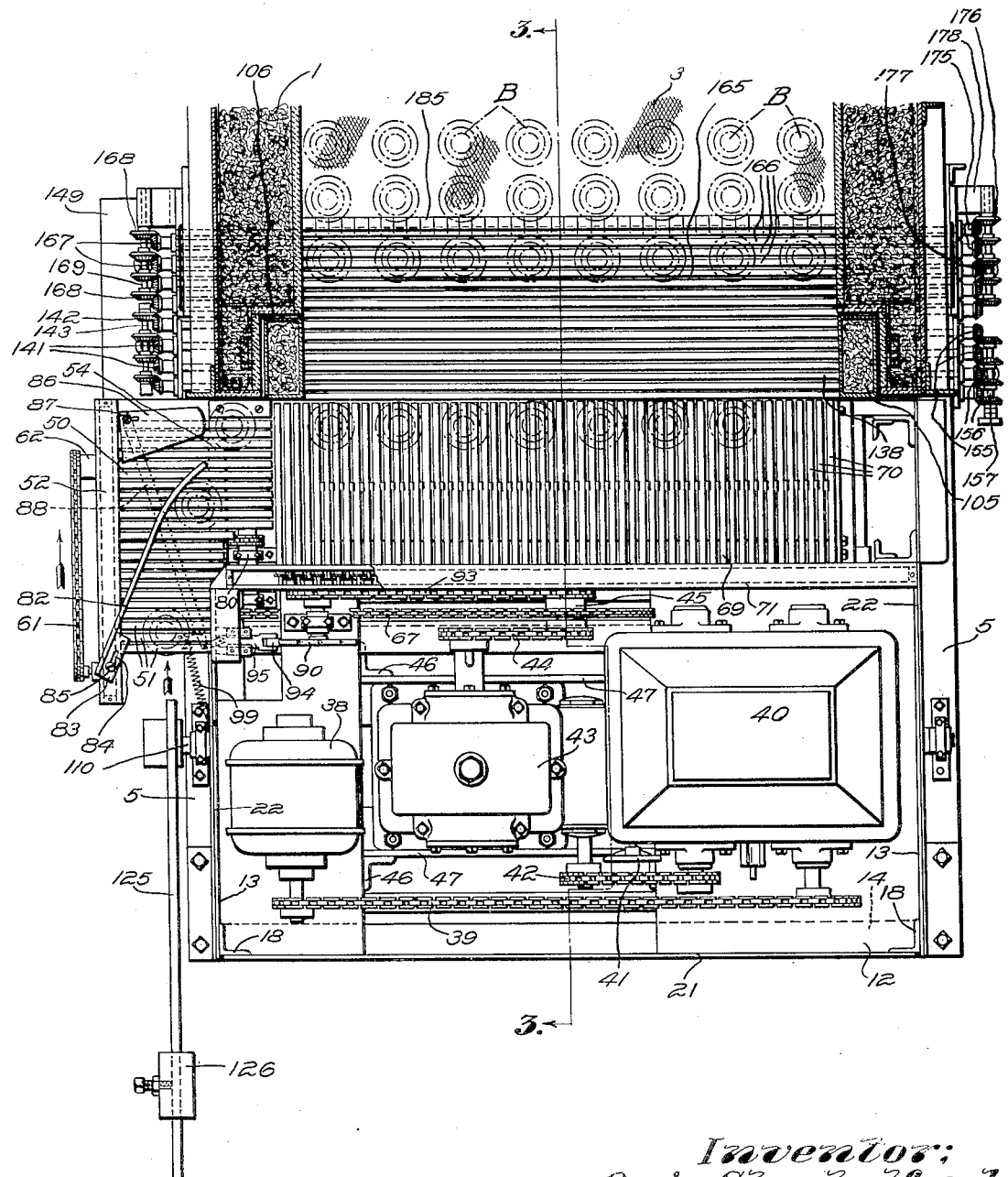

May 23, 1933. O. SHACKELFORD 1,911,093
STACKER FOR GLASSWARE ANNEALING LEERS
Filed Feb. 16, 1932 8 Sheets-Sheet 3
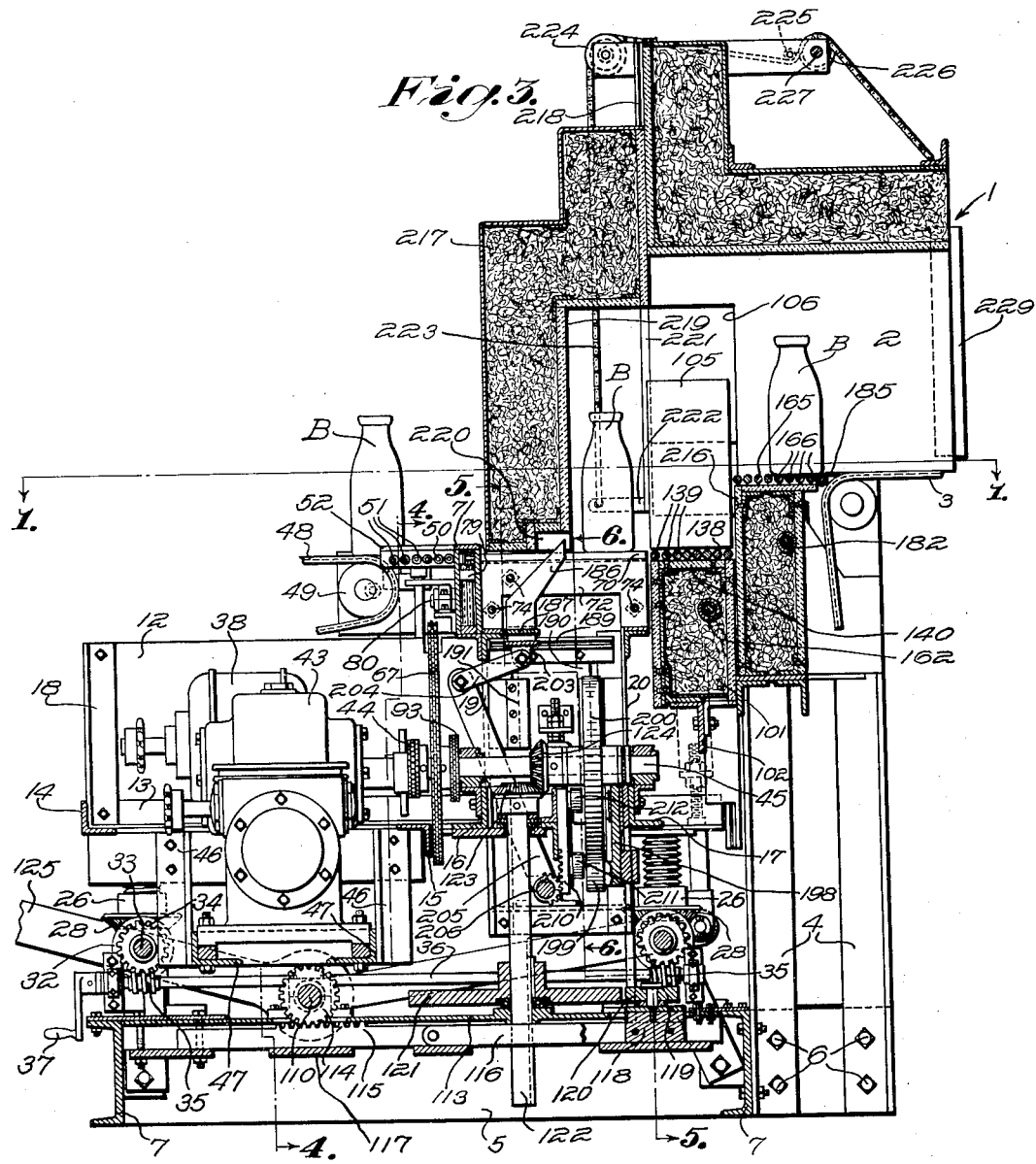

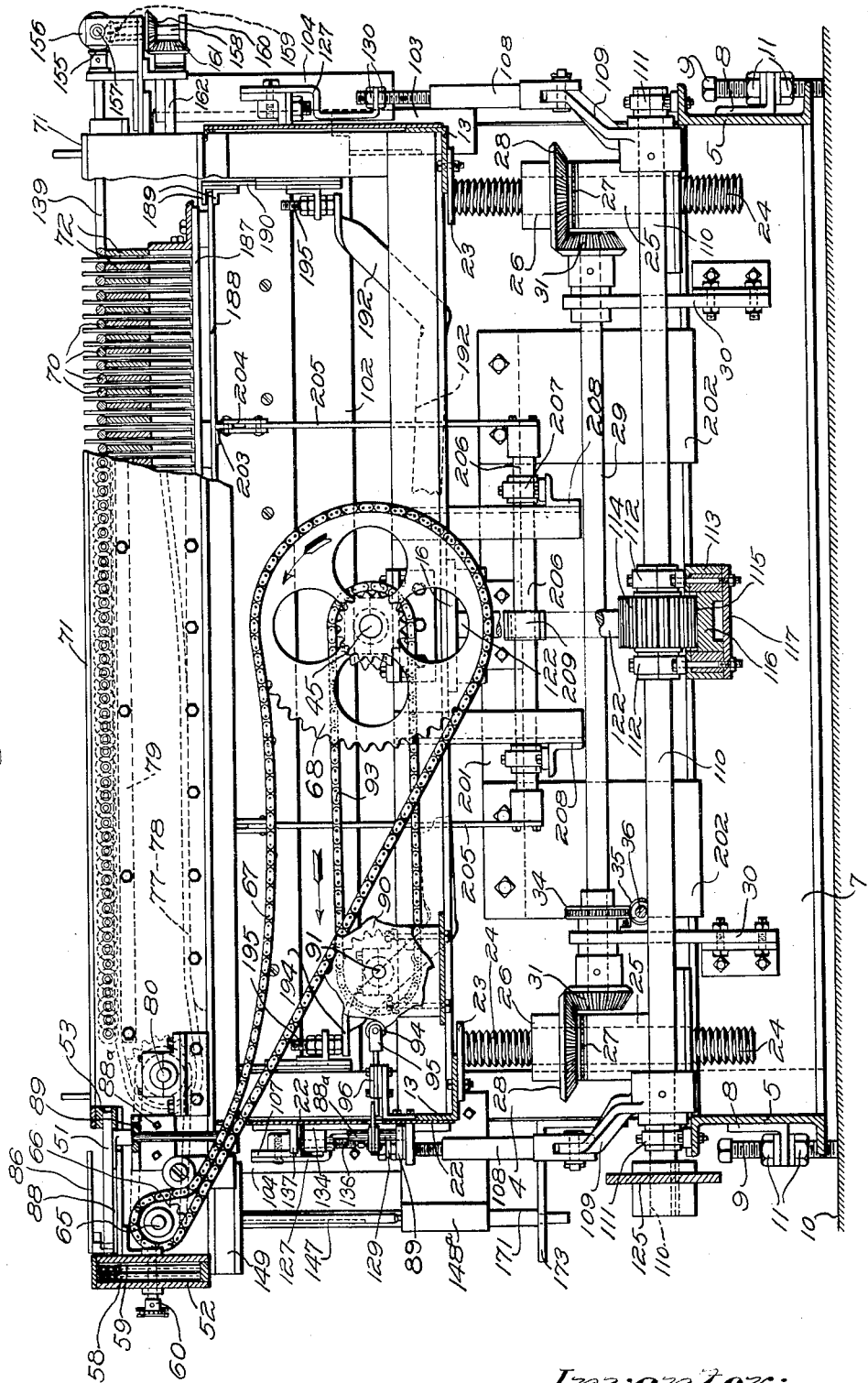

May 23, 1933. O. SHACKELFORD 1,911,093
STACKER FOR GLASSWARE ANNEALING LEERS
Filed Feb. 16, 1932 8 Sheets-Sheet 5
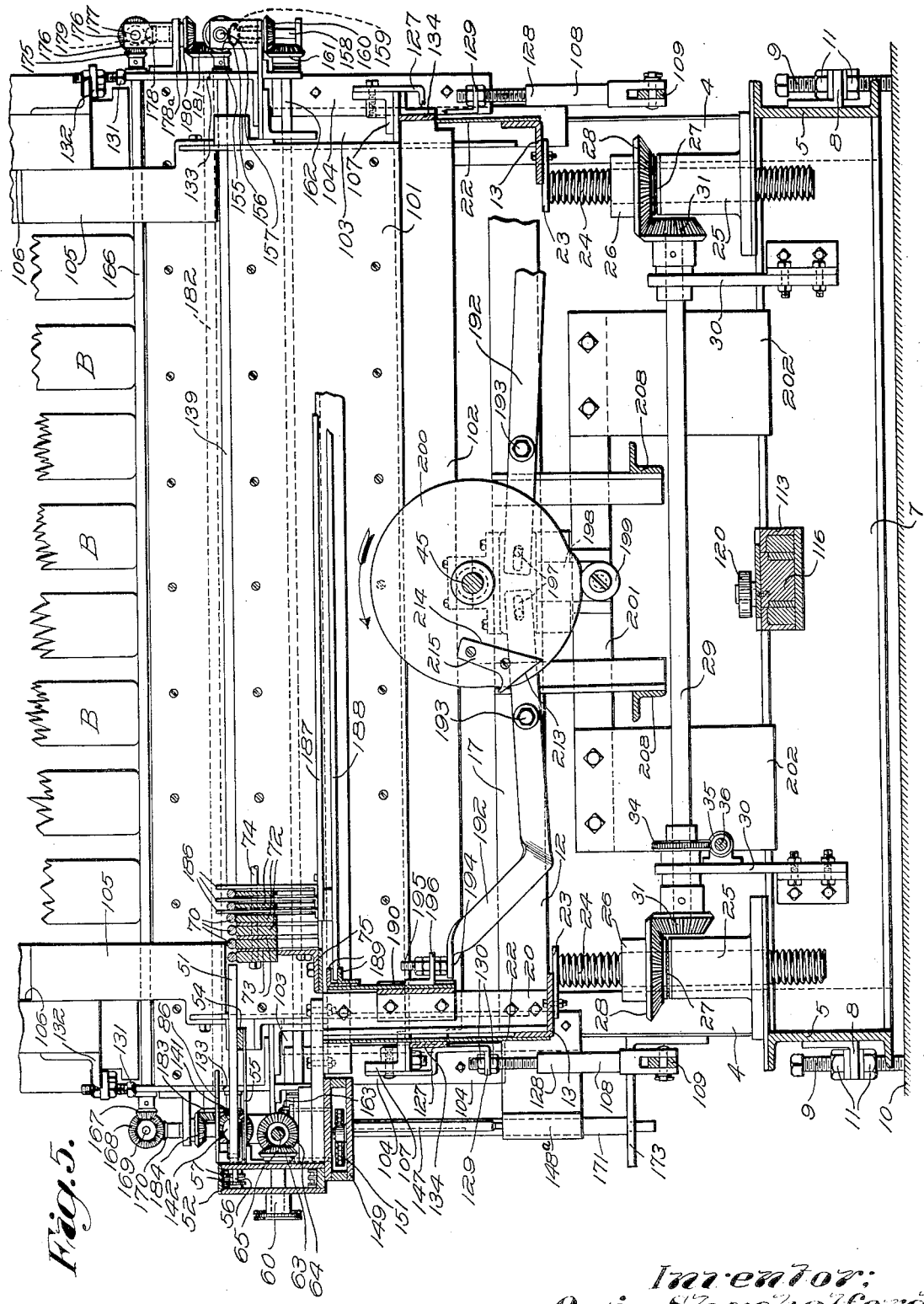

May 23, 1933.    O. SHACKELFORD    1,911,093
STACKER FOR GLASSWARE ANNEALING LEERS
Filed Feb. 16, 1932    8 Sheets-Sheet 6
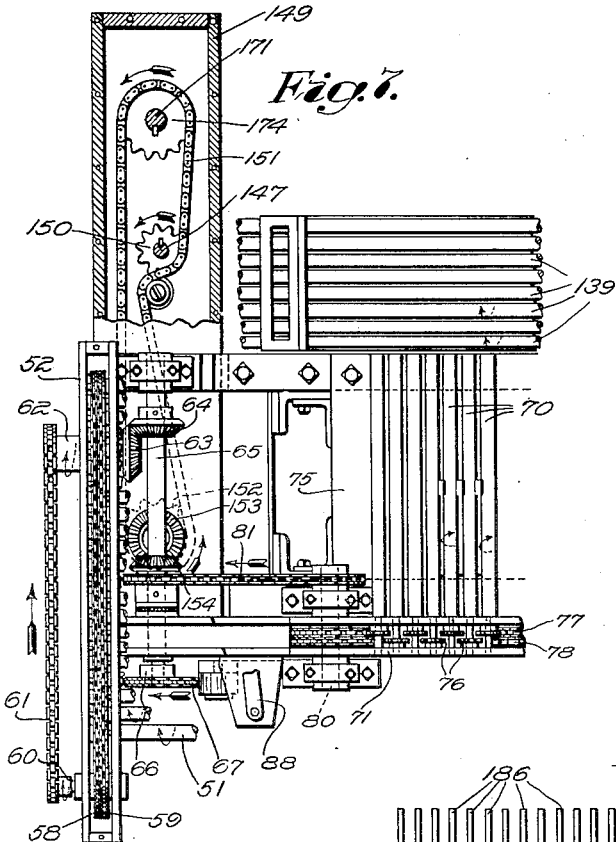
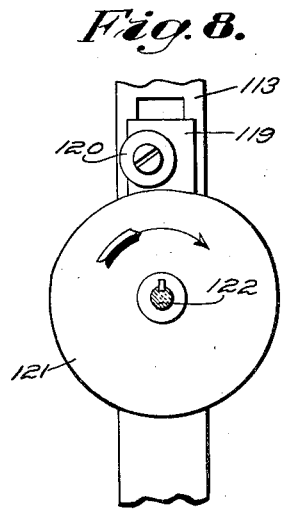
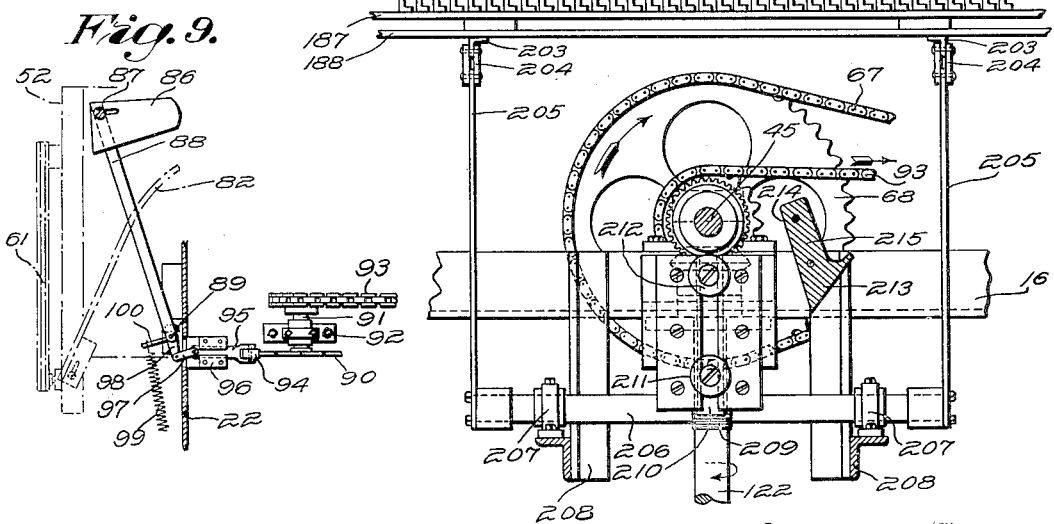
Witness;
W. B. Thayer
Inventor:
Orie Shackelford
by Brown & Parham
Attorneys

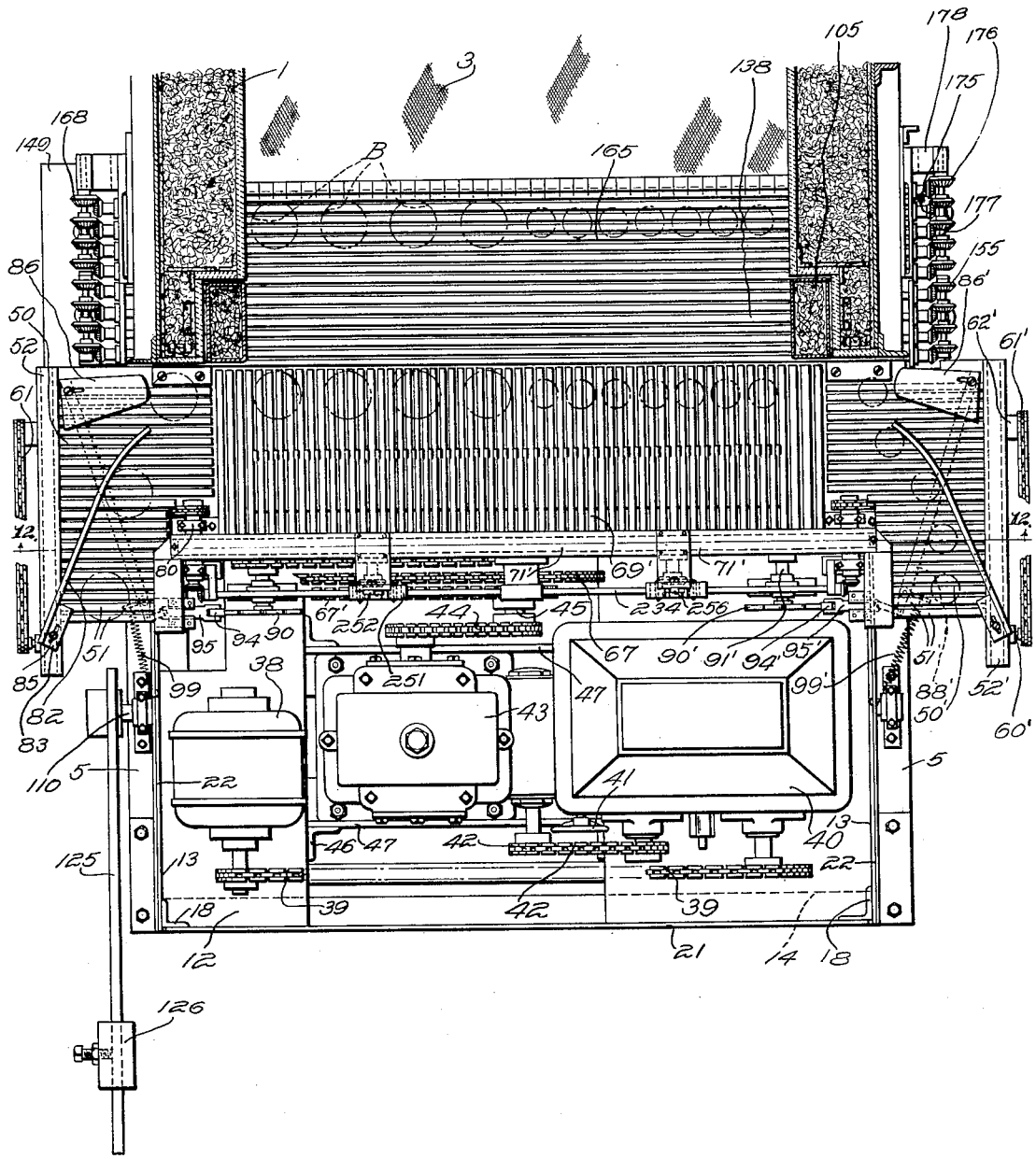

May 23, 1933.  O. SHACKELFORD  1,911,093
STACKER FOR GLASSWARE ANNEALING LEERS
Filed Feb. 16, 1932   8 Sheets-Sheet 8
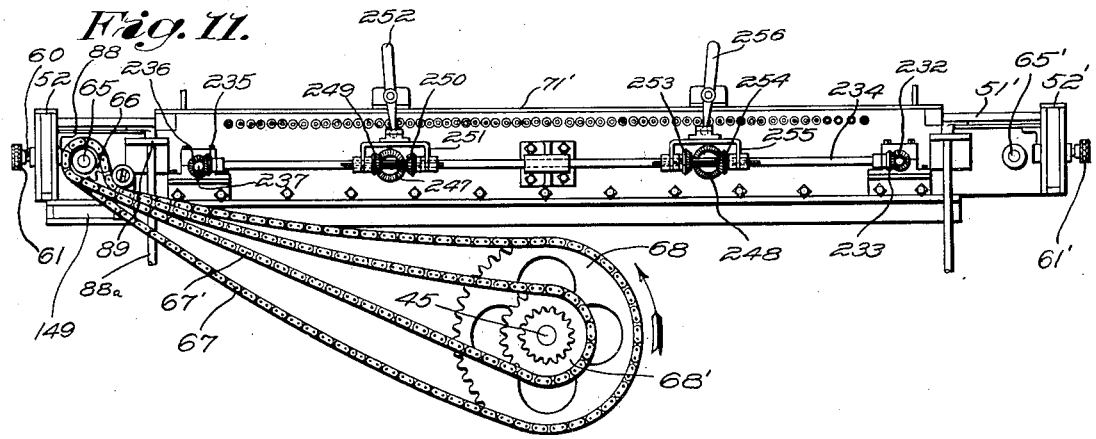
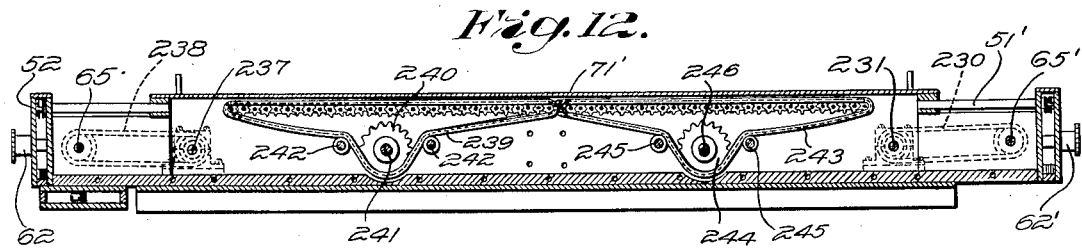
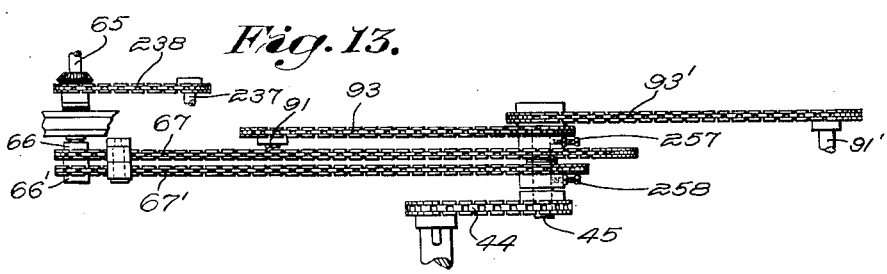
Inventor:
Orie Shackelford
by Brown & Parham
Attorneys
Witness:
W. B. Thayer Patented May 23, 1933

1,911,093

UNITED STATES PATENT OFFICE

ORIE SHACKELFORD, OF FAIRMONT, WEST VIRGINIA, ASSIGNOR TO HARTFORD-EMPIRE COMPANY, OF HARTFORD, CONNECTICUT, A CORPORATION OF DELAWARE

STACKER FOR GLASSWARE ANNEALING LEERS

Application filed February 16, 1932. Serial No. 593,252.

This invention relates to glassware handling mechanism, particularly to mechanism for stacking glass articles onto the conveyor of a continuous glassware annealing leer, to the cooperation of such a mechanism with a leer, and to certain phases of leer construction cooperating particularly with a stacking mechanism embodying my invention. Certain phases of my present invention are of general utility in ware handling, while other phases are more intimately associated with the construction and operation of glassware annealing leers.

Among the objects of my present invention is to provide a stacker mechanism of improved design, which will move articles of glassware received in single file to desired positions upon the conveyor of an annealing leer.

A further object of my present invention is to provide a stacking mechanism which may be associated with a leer in such a way that the temperature conditions within the leer are disturbed as little as possible by external conditions due to the existence of the necessary openings for the substantially continuous introduction of articles to be annealed into the leer.

A further object of the present invention is to provide article conveying mechanism including an elevator having a conveyor means associated therewith, which is continuously operable independently of the position or movement of the elevator.

A further object of the present invention is to provide an elevator having a continuously operating conveyor thereon in which provision is made for preventing articles from being prematurely moved off the elevator.

A further object of the present invention is to provide a combined stacker and elevator mechanism in which articles are received at a lower level than that of the leer conveyor and are raised to the proper level and suitably positioned upon the leer conveyor.

Further objects of the present invention are to provide in connection with an elevator for moving glassware, as above described, suitable means for adjustably determining the upper and lower limits of the travel of the elevator and for assuring that the elevator is level at its uppermost and lowermost positions as thus determined.

A further object of the present invention is to provide a transverse conveyor of the roller type for use in a stacker having article pusher fingers movable above the plane of the conveyor during their active travel and below such plane during their inactive travel.

A further object of the present invention is to provide in a glassware stacker, transverse conveyor means alternatively usable for conducting articles from either side of a glass annealing leer to positions across the leer in alignment with the tunnel thereof, so that they may be moved upon the leer conveyor, thus enabling the leer to anneal articles formed in at least two different forming machines which deliver the articles to opposite sides of the ware-entering end of the leer.

A further object of the present invention is to provide in a glassware stacker, a cross conveyor for presenting glassware to a ware stacking device proper, whereby articles may be alternatively conveyed from either side all the way across the leer or from either or both sides part way across the leer, and thereafter stacked upon the leer conveyor.

A further object of the present invention is to provide suitable mechanism which will efficiently and expeditiously carry out all the foregoing objects.

Further objects and advantages of the present invention will become apparent from a reading of the following specification and subjoined claims when taken in connection with the accompanying drawings, in which:

Figure 1 is a plan view of my stacking mechanism with portions of the leer omitted or shown in section on the line 1—1 of Fig. 3;

Fig. 2 is a side elevation of my mechanism in cooperative relation with the ware-receiving end of a leer, the view being taken from the left in Fig. 1;

Fig. 3 is a vertical section taken substantially on the line 3—3 in Fig. 1;

Fig. 4 is a view partly in elevation and partly in vertical section on the broken line 4—4 of Fig. 3, the view being on an enlarged scale;

Fig. 5 is a view substantially in vertical section on the line 5—5 of Fig. 3, parts being broken away or omitted for convenience of illustration, the view being on substantially the same scale as Fig. 4;

Fig. 6 is a fragmentary detail view partly in elevation and partly in vertical section on the line 6—6 of Fig. 3, showing particularly the mechanism for oscillating the pusher fingers and the mounting thereof;

Fig. 7 is a fragmentary detail plan view with parts broken away and in horizontal section, illustrating the driving means for certain of the rollers;

Fig. 8 is a fragmentary detail view principally in plan showing certain of the operating means for raising and lowering the elevator;

Fig. 9 is a fragmentary detail view principally in plan of the operating mechanism for the lateral pusher, certain related parts being shown in dot and dash lines in their proper relative positions;

Fig. 10 is a view similar to Fig. 1 showing a modified form of my device;

Fig. 11 is a fragmentary detail view in elevation of certain of the conveyor roll actuating means and reversing means usable with the mechanism shown in Fig. 10;

Fig. 12 is a view principally in vertical section of the actuating means for the reversible sections of rollers of the transverse conveyor taken substantially on the line 12—12 of Fig. 10; and Fig. 13 is a fragmentary detail view principally in plan showing certain of the driving connections usable in the form of the device shown in Figs. 10 and 11.

The form of my device shown in Figs. 1 to 9 inclusive, comprises a preliminary conveyor for conducting articles from any desired point toward the leer in a direction longitudinally thereof. This conveyor is preferably of the "live roller" type, that is a conveyor, the active surface of which comprises a plurality of rollers all positively driven for moving the ware. There is provided adjacent to the latter portion of the conveyor a deflector by which the articles are moved laterally of the conveyor to the desired lateral position thereon, this deflector being stationary but adjustable. The articles are then moved one by one in a direction transversely of the leer and onto a transverse conveyor, this also being of the live roller type. In this way a succession of articles is placed upon the transverse conveyor. When a complete row of articles has been so placed, the articles are pushed from this conveyor in a direction longitudinal of the leer onto an elevator, the floor of which is preferably made up of a plurality of live rolls which move the articles continuously in a direction longitudinally of the leer and toward the leer conveyor. The articles are prevented from being prematurely moved off the elevator by the continuous movement of the rolls forming the floor thereof by a wall against which the articles would abut before they could be moved off the elevator. The elevator is then raised bringing the articles to a desired level with respect to another live roller conveyor disposed within the leer which at the uppermost position of the elevator forms a continuation of the elevator conveyor. The row of articles on the elevator are thus moved off the elevator while it remains in its uppermost position and moved toward the leer conveyor. A suitable bridging plate is preferably provided between the last roll of the last mentioned live roller conveyor and the leer conveyor, so that the articles are moved by the roller conveyor across this plate and onto the leer conveyor. The various steps in the path of movement of the articles is clearly shown by Figs. 1 and 3.

At the front of the leer there is provided a door structure of peculiar shape which in effect forms a heat trap having in this form of the device but one opening at one side which is of a size sufficient only to admit one article at a time. There is an opening at the lower portion of the door at a level below that of the leer conveyor, but this is substantially blocked by the transverse conveyor. By the use of this door structure, indrafts of cold air into the leer which might harmfully affect the temperature control therein are minimized as is also any loss of heat by radiation or otherwise from the inside of the leer tunnel, the door being provided with suitable insulation for retaining heat within the tunnel.

Turning now more particularly to the drawings and considering the embodiment of my invention shown in Figs. 1 to 9 inclusive, there is illustrated the forward or ware-receiving end of a continuous tunnel leer 1, having a ware tunnel 2 through which articles of glassware B are adapted to be moved by a conveyor 3, which may be of the type shown and described in the patent to Ingle 1,583,046, granted May 4, 1926. The details of the leer, its heating and other temperature controlling arrangements, its conveyor drive, etc., form no part of the present invention and will not, therefore, be described in detail, the present invention being confined to the stacker and to its cooperation with the forward or ware-receiving end of the leer.

Supporting the forward end of the leer 1 is a standard shown as constructed of angle members 4, the remainder of the leer being supported in any suitable manner, as for example in the manner shown in the patent to Mulholland 1,560,481, granted November 3, 1925.

Stationary supporting structure

The stacking device embodying my invention is suitably supported in a manner to cooperate with the forward or ware-receiving end of the leer 1, the supports preferably being rigid with the leer supporting members 4. As shown, the supporting structure comprises a pair of channels 5, one at each side, which are bolted or otherwise suitably secured to the supporting members 4 as at 6 (Fig. 3). Channels 5 may be suitably connected together preferably adjacent to their front and rear ends by cross channels 7 which are suitably secured to the channels 5, the rear channel 7 being indicated in Fig. 3 as bolted to a pair of the vertically disposed angle members 4. In order to insure that the channels 5 are properly leveled in an installation which may be made upon a somewhat uneven floor, these channels are provided with outwardly extending angle brackets 8 (Figs. 2, 4 and 5) through which pass jack screws 9, the screws being secured in adjusted position abutting the floor or support 10 by suitable jam nuts 11. Thus, by proper adjustment of the screws 10 and nuts 11 the supporting framework comprising channels 5 and 7 may be properly leveled.

Mechanism and conveyor carrying frame—vertical adjustment therefor

In different installations in which my device is susceptible of use, ware may be presented to the stacking device at a plurality of different levels, some or all of which may be below the level of the leer conveyor 3. For this and other reasons, I have provided preliminary conveyors operating to present the ware in a row transversely of the leer which conveyors are susceptible of adjustment to different levels at which ware may be received. I have also provided simple and effective means for varying the level of these preliminary conveyors and compensating adjustments for cooperating mechanism. For purposes principally of convenience I have mounted the major portion of the operating mechanism for my stacker in a mechanism box or carrier which is vertically adjustable with these preliminary conveyors, so that there need be no special arrangements for power transmission to accommodate and compensate for variations in level of the preliminary conveyors.

To this end there is provided a mechanism and a conveyor carrier structure or box generally indicated at 12, which may be built up of horizontal angles 13 at the lower side corners and cross angles 14, 15, 16 and 17 (Fig. 3). There are also provided vertically disposed angles 18 at the front corners and 19 and 20 toward the rear (see Fig. 3) on each side. Sheet metal plates 21 at the front and 22 at the sides are provided for enclosing the operating mechanism and preventing ingress of dust and other foreign matter, the plates being suitably secured to the structural angles forming the frame of the box 12. The top above the driving mechanism, seen at the left in Fig. 3, may be closed, such closure not being shown however in the drawings.

The box 12 and parts carried thereby are adapted for vertical adjustment, as above set forth, in order to adjust the conveyors carried thereby, (later to be described) and the operating mechanism located therein. To this end the angles 13 may have secured thereto suitable plates 23 (Figs. 2, 4 and 5) against which jack screws 24 located one at each of the four corners of the box 12 may abut, or if desired, to which these screws may be secured. The jack screws 24 are vertically disposed and pass downward through suitable bearing members 25 rigid with the base frame members 5 and 7. Threaded on the jack screws 24 are nuts 26, the lower faces of which may be separated from the bearing members 25 in any suitable manner as by the interposition of ball bearings indicated at 27 (Figs. 4 and 5).

In order to provide simple and effective means for adjusting all the jack screws 24 in unison and by a single operation, each of the nuts 26 is provided with an integral bevel gear 28. The rear pair of gears 28 are interconnected for simultaneous rotation by mechanism including a cross shaft 29 journaled in bearing brackets 30 which are secured to the rear channel 7. The cross shaft 29 is provided with bevel gears 31 at each end meshing respectively with the rear gears 28. The forward gears 28 are similarly interconnected for simultaneous movement by bevel gears 32 mounted upon a cross shaft 33 (Figs 2 and 3) which is suitably journaled in bearings secured to the forward cross channel 7. The forward and rear cross shafts 29 and 33 are connected for simultaneous operation by providing each of these shafts with a worm wheel 34 secured thereto, both worm wheels meshing with worms 35 secured to a longitudinally extending shaft 36, which may be provided at its forward end with a hand crank 37 (Fig. 3). The jack screws 24 are provided with right or left-hand threads, as the case may be, so that by rotating crank 37 in the proper direction, the mechanism box 12 and parts carried thereby may be raised or lowered and at the same time maintained level at all vertically adjusted positions.

Main drive, speed reducing and varying mechanisms

All the operating parts of my device are preferably driven from a single source of power, here shown as a uni-directional electric motor 38 (Figs. 1 and 3) suitably mounted in the box 12. Power from this motor may be transmitted by a sprocket chain 39 to a speed changing device 40, also mounted in the box 12. This device may be of any desired commercial type and as shown is adjustable by the hand wheel 41 to vary the speed change effected thereby. Power from the device 40 is shown transmitted through the sprocket and chain connection 42 to a speed reducing mechanism 43, which may also be of any desired commercial type, and which is suitably mounted in the box 12. Power from the speed reducing device 43 is shown transmitted through the sprocket and chain connection 44 to the main driving shaft 45 from which all operating parts of the device are adapted to be driven, as will hereinafter be described. The shaft 45 is journaled in suitable bearings secured to the frame of the box 12 as illustrated in Fig. 3. The speed reduction device 43 is shown mounted in a supporting structure of vertically disposed angles 46 and horizontally disposed angles 47.

Thus is will be seen that the main drive shaft 45 will be driven continuously at a relatively slow speed by the motor 38, and that this speed may be changed by adjustment of the hand wheel 41, the direction of drive of the shaft 45 being indicated by the arrows in Figs. 4 and 5.

Preliminary conveyor for moving articles toward leer—longitudinally thereof

As indicated in Fig. 3, articles may be received adjacent to the stacker of my present invention from any suitable conventional type conveyor, as indicated at 48, which may pass about a roller 49 journaled in suitable bearings secured to the box 12. This conveyor, however, forms no part of the present invention and is merely illustrative of one manner in which bottles or other glass articles may be supplied to the mechanism embodying my invention.

I have shown, however, a preliminary conveyor generally indicated at 50, seen at the left in Fig. 1, by which articles of ware are moved in a direction longitudinal of the leer and toward the forward or ware-receiving end thereof. This conveyor is preferably of the live roll type and comprises a plurality of rollers 51, certain of which are shorter than the rest in order that they may be accommodated in the space available. It will be noted particularly that the majority of these rollers are provided with bearings at one end only, namely, at the left as seen in Fig. 1, the bearings being located in a bearing box 52, and that their right-hand ends as seen in Figs. 1 and 5 are free. Others of the rollers 51 toward the front are shown as provided with bearings 53 at the right hand ends, as seen in Fig. 4. The free end rollers may be supported at a distance from their bearings by a suitable supporting block or bar 54 (Figs. 1 and 5), this bar being supported by members 55 from the bearing box 52. The details of the principal bearings for the rollers 51 are clearly illustrated in Fig. 5 and comprise reduced end portions 56 for each roller pivoted at two spaced points in the sides of the bearing box 52.

Means are provided for positively driving the rollers 51. For this purpose the rolls are each provided with a sprocket wheel 57 secured thereto intermediate the two bearings in the sides of the box 52. Alternate rolls have their sprocket wheels in alignment as shown, so that the sprocket wheels are all in two parallel lines. As shown these sprocket wheels are engaged by a pair of sprocket chains 58 and 59 (Fig. 7) each of which engages over one row or line of sprocket wheels 57, both chains passing around drive sprockets at the forward end of the box 52. These drive sprockets are both secured to a shaft 60 journaled in the sides of bearing box 52 and provided at its outer end with a sprocket and chain connection 61 for the transmission of power from a short shaft 62 also journaled in the two sides of bearing box 52. The shaft 62 is shown provided at its inner end with a bevel gear 63 meshing with a bevel gear 64 upon the main roller driving shaft 65. Shaft 65 is journaled in suitable bearings rigid with box 12 and is provided at its forward end with a sprocket wheel 66 driven by a sprocket chain 67 from a large sprocket wheel 68 secured to the main driving shaft 45 of the machine (Figs. 4 and 7). Thus, the rollers 51 of the conveyor 50 are positively and continuously driven to move articles in the direction of the arrow in Fig. 2.

Transverse conveyor and drive therefor

There is shown across the forward or ware-receiving end of the leer a transverse conveyor, generally indicated at 69, here shown as comprising a plurality of live rolls 70, these rolls being mounted in a bearing box 71, similar to the bearing box 52, and in the same manner, as clearly indicated in Fig. 7. The rolls 70 are supported over substantially their entire length to prevent their sagging by suitable supporting members 72 (see Figs. 4 and 5), the members 72 being of suitable material for minimizing friction and serving as a resilient support for the rollers at points spaced from their pivots. The supporting members 72 are separated by suitable spacers, indicated at 73, (Fig. 5). Members 72 and 73 are tied together by tie rods 74 (Figs. 3 and 5). The tie rods pass through suitable plates at either end, which are supported by angle brackets 75 from suitable structural members rigid with the box 12.

The rolls 70 of the conveyor 69 are adapted to be driven by means similar to the driving means for the rolls 51 of the conveyor 50, including sprockets 76 (Fig. 7) on each of the rolls 70 alternately positioned in two lines and engaged by a pair of sprocket chains 77 and 78. In this case, however, the active parts of the sprocket chains 77–78 pass beneath the sprockets 76, as indicated in Fig. 4, and are supported upon a suitable angle 79 which retains them in engagement with the several sprockets. Sprocket chains 77 and 78 pass around a pair of sprocket wheels mounted upon a short shaft 80 (Figs. 4 and 7), the shaft 80 being journaled in suitable bearings rigid with the box 12. The shaft 80 is driven by a sprocket and chain connection 81 (Fig. 7) from the main roller drive shaft 65, which receives its power, as above set forth, from the main drive shaft 45 of the stacker.

Thus it will be seen that once the ware is placed upon the transverse conveyor 69 of Fig. 1, it will be moved from left to right, as seen in that figure, by the continuous operation of the live rolls making up the conveyor.

*Stationary deflector cooperating with preliminary conveyor*

Due to space requirements of the mechanism provided by this invention, it is necessary that the articles be moved laterally of the preliminary conveyor 50 in order that they may be expeditiously handled. For this purpose I provide a stationary but adjustable deflector shown at 82 in Fig. 1, and also indicated in dotted lines in Fig. 9. This deflector cooperates with the conveyor 50 to move the articles from left to right thereon, as indicated by the three dot and dash line positions of articles indicated in Fig. 1.

The deflector is made adjustable by providing it with a flange 83, having a slot 84 therein, through which extends a securing means, here indicated as a screw 85, which may be threaded into the upper side of the gear box 52.

Thus, it will be seen that the deflector may be considered as adjustable both as to the length it extends from the screw 85 and also the angle at which it is disposed with respect to the conveyor 50. The adjustment in this case is manual and is accomplished by loosening the screw 85, setting the deflector in the desired position, and again tightening the screw.

*Lateral pusher and operating means therefor*

For the purpose of moving articles of ware laterally from the conveyor 50 onto the conveyor 69, I provide an intermittently oscillatable pusher device which is adapted to engage one article at a time and move it from left to right, as seen in Fig. 1, from the conveyor 50 onto the conveyor 69. This pusher may comprise a pusher blade 86 adjustably secured at 87 to the outer end of an actuating lever 88 (Figs. 1 and 9). The blade 86 is provided with a suitable slot through which extends a screw, thus providing for suitable manual adjustment of the position of the blade and providing for the use of interchangeable blades should it be desired to handle ware having different configurations. The lever 88 is secured to the upper end of a shaft 88a (Figs. 2 and 4) which is journaled at 89 (Figs. 2, 4 and 9) in bearing members rigid with the box 12, so that upon movement of the pusher 86 to the right, clockwise about its pivot (as seen in Figs. 1 and 9), it will be effective to move an article from the conveyor 50 onto the conveyor 69.

Means are provided for actuating the pusher in synchronized time relation to the operation of the conveyor rolls, such means comprising a cam 90 (Figs. 1, 4 and 9) secured to a shaft 91 which is journaled in a bracket 92, this bracket being in turn secured to a suitable part rigid with the box 12. The cam is positively driven by a sprocket and chain connection 93 from the main driving shaft 45 of the stacker. Cooperating with the cam 90 is a cam roller 94 mounted in the end of a slide 95 which is movable in suitable guide ways 96 secured to the side plate 22 of the box 12. The end of the slide 95 opposite the roller 94 is connected by a link 97 to a suitable crank arm 98 extending from the shaft 88a. The roller 94 is urged against the cam 90 and the lever 88 retracted by a tension spring 99 connected between a suitable anchorage on the box 12 and a short crank lever 100 extending from the shaft 88a.

Thus, it will be seen that the pusher 86 will be operated to push articles successively from the conveyor 50 onto the conveyor 69 in synchronized time relation with the drive for the rolls of these conveyors.

*Elevator, elevator conveyor—construction, mounting and operation*

As shown in the accompanying drawings, articles are moved from the conveyor 69 after a row of articles has been positioned thereon, substantially as indicated in Fig. 1, onto an elevating device, positioned within the forward or ware-entering end of the leer, for the purpose of moving such articles from the lower level of the conveyors 50 and 69 up to a level such that the articles may be moved onto the leer conveyor. It is to be understood, of course, that in certain installations where the conveyors 50 and 69 are substantially on a level with, or but slightly above, the level of the leer conveyor, the elevator need not be used and a suitable conveyor or other bridging device may be used for accommodating the movement of the articles directly from the conveyor 69 to the leer conveyor. I prefer, however, to provide such an elevator for reasons hereinafter to be more fully set forth.

As shown in the accompanying drawings (particularly Fig. 3), the elevator is generally indicated at 101 and comprises a rigid supporting structure which may be made of metallic structural members suitably provided at its top and sides with relatively rigid heat insulating material, such as transite, to form a casing which is preferably filled with non-rigid insulating material such as kieselguhr. On the under side of the elevator is an angle member 102 for rigidity of construction and at each side is a vertically disposed angle member 103 (see Fig. 5). The angle members 103 are received in suitable vertical guideways 104 which are rigid (in a manner not shown) with the vertical structural members 4 which support the leer. In this way the elevator is guided in its vertical movement. At each side and above the elevator proper there may be provided suitable insulating casings 105 (Figs. 1, 3 and 5), which fit loosely in recessed portions 106 in the inside front corners of the leer walls.

Means are provided for raising and lowering the elevator at the desired times and in synchronism with the operations of other parts of the apparatus. For this purpose the horizontal web of the angle 102 is extended laterally beyond the sides of the elevator proper and to these lateral extensions are secured angle brackets 107 (Fig. 5). Pivoted on horizontal pivots to the angle brackets 107 are a pair of links generally indicated as 108, which are connected to the rearward ends of levers 109 (Figs. 2, 4 and 5). Levers 109 are suitably secured to a transverse shaft 110 journaled in suitable bearings 111 secured to the channels 5 and also in bearings 112 secured to a channel 113 (Figs. 4 and 5) which extends between the cross channels 7, as seen also in Fig. 3. Between the bearings 112 a pinion 114 is secured to the shaft 110, this pinion meshing with rack teeth 115 formed on a slide member 116. The slide member 116 is supported by suitable cross members from the channel 113, as indicated in Figs. 4 and 5. One of these cross members is indicated at 117 and is positioned directly beneath the pinion 114 to insure the proper meshing of the rack teeth 115 with the pinion 114. At its rear end the slide 116 carries a member 118, which projects up through a suitable aperture in the center web of the channel 113, as indicated in Figs. 3 and 8. The projection 118 is provided with a cross plate 119 in sliding relation with the upper surface of the channel 113. Pivoted on a vertical axis to the projection 118 and plate 119 is a cam roller 120 which cooperates with a cam 121. Cam 121 is splined to a vertically disposed shaft 122 which is mounted in suitable bearings in the channel 13 and in a portion of the box 12. The shaft 122 may project through a suitable aperture in the slide 116 or the slide may be made in several parts as shown which straddle the lower end of the shaft 122. At its upper end the shaft 122 is provided with a bevel gear 123 (Fig. 3) which meshes with a bevel gear 124 on the main stacker drive shaft 45. Downward thrust incident to the driving of gear 123 by gear 124 is taken up by a suitable ball bearing between the lower side of the gear 123 and the bearing in the bottom of the box 12. Another ball bearing may be provided between the lower side of the cam 121 and the upper side of the channel 113, as indicated in Fig. 3. The splining of the cam 121 to the shaft 122 assures that the cam will be in proper position to cooperate with cam roller 120 at all vertically adjusted positions of the box 12.

Means are provided for counterbalancing the weight of the elevator structure comprising a lever 125 (Figs. 1 and 3) secured to the shaft 110 and provided with an adjustable weight, as indicated at 126 (Fig. 1).

Means are also provided for varying the uppermost position to which the elevator 101 is raised by the elevator operating mechanism above described, such means including means for adjusting the length of the links 108. As shown these links comprise bent strip members 127 which are pivoted at their upper ends to the brackets 107 and which are adjustably connected to the lower end portions 128 of the links 108 at 129 by forming the portions 128 with reduced threaded ends passing through bent parts of the members 127 and provided on either side thereof with jam nuts 130. By proper adjustment of the positions of nuts 130 on the threaded upper ends of the members 128, the upper position of the elevator may be adjustably determined.

Means are provided for positively limiting the upward movement of the elevator and at the same time insuring that it is level at its uppermost position, comprising a pair of adjustable stops 131 comprising bolts threaded through suitable brackets 132 rigid with the leer 1 and secured in adjusted position by jam nuts on the bolts. The lower ends of these bolts 131 are adapted to be engaged by the upper edges 133 of brackets rigid with the elevator. Thus, when the elevator is moved upwardly until the top edges 133 of these brackets contact with the lower ends of the bolts 131, the uppermost position of the elevator is predetermined and it is assured that the elevator will be level at this position.

Means are also provided for adjustably determining the lowermost position of the elevator and for insuring that the elevator is level at this position. This means comprises a pair of levers 134 (Figs. 2 and 5) located one at each side of the box 12 and pivoted intermediate their ends at 135 to this box. The rear ends of the levers are positioned beneath the projecting web portion of the angle 102 of the elevator, so that as the elevator approaches its lowermost position, the levers 134 will be rocked to move their forward ends up. The forward ends of these levers are provided with suitable upwardly directed stop screws 136 (Fig. 2) threaded through laterally projected portions of the levers 134 and securable in adjusted position by jam nuts, these stop screws being adapted to engage brackets 137 secured to the side panels 22 of the box 12.

Thus, it will be seen that by suitable adjustments of the stop screws 136, the lower position of the elevator is determined and the leveling of the elevator at this lower position is assured. As shown in the drawings, at the lower position of the elevator the cam roll 120 is spaced from the cam 121, but this is immaterial as the elevator is constructed somewhat heavier than the effective counterweight used and so will be moved to its extreme lowermost position by gravity, the cam 121 becoming effective at the desired time to raise it to its uppermost position and maintain it there for the desired time.

Due to the mounting of the stop means for determining the lowermost position of the elevator 101, that is both levers 134 and stop brackets 137 on the box 12, any vertical adjustment of the box 12 and conveyors 50 and 69 carried thereby will be automatically compensated for without further adjustments being required in the elevator moving means. In other words, the elevator will always be lowered until it rocks the levers 134 to bring the stop screws 136 against the stops 137. Thus once these are properly adjusted to cause the lowermost position of the elevator to be in horizontal alignment with the conveyor 69, this relation will be maintained irrespective of subsequent adjustments of the box 12 and conveyors 50 and 69 carried thereby.

The ware contacting surface of the elevator is constructed as a portion of a conveyor. In the instant case there is shown a conveyor of the live roll type comprising a plurality of rolls extending from side to side of the elevator and adapted for moving articles in a direction longitudinal of the leer and toward the leer conveyor 3. The elevator conveyor is designated generally by the reference character 138 and comprises a plurality of continuously driven rolls 139, the rollers being mounted in bearings at each end in the elevator structure and being supported intermediate their ends upon the top surface plate 140 of the elevator body.

Means are provided for driving the elevator rolls independently of the position or movements of the elevator. Such means in the present instance comprising a driving means located at each side of the elevator for driving alternate rolls.

Considering first the rolls which are driven from the left as seen in Fig. 1, these rolls are provided at their left-hand ends with bevel gears 141 each of which meshes with a bevel gear 142. Bevel gears 142 are mounted upon a horizontal extending shaft 143 which is suitably journaled in bearings in a pair of brackets 144 and 145 moving with the elevator (Fig. 2). A plate 146 is secured to the brackets 144 and 145 and carries the upper bearing for a vertically disposed shaft 147, the lower bearing 148a of which is carried by a member depending from the elevator. In its upper end the shaft 147 carries a bevel gear 148 meshing with one of the bevel gears 142 and thus driving the shaft 143 and the rolls which are driven from this (the left-hand) end as seen in Fig. 1. The shaft 147 passes through a stationary gear casing 149 and is provided intermediate the upper end lower plates of this casing with a sprocket wheel 150 (Fig. 7) splined thereto so as not to partake of the raising and lowering movements of the elevator and the shaft 147. The sprocket wheel 150 is driven by a sprocket chain 151 within the gear box 149 passing about it and about a sprocket wheel 152 secured to the lower end of a short vertical shaft which is journaled in the gear casing 149 and which carries at its upper end a bevel gear 153 meshing with a bevel gear 154 secured to the main roller driving shaft 65. Thus power from the main roller driving shaft is continuously transmitted to drive the elevator conveyor rollers at the left as seen in Fig. 1. The splining of sprocket wheel 150 to the shaft 147 also permits vertical adjustment of the box 12, the conveyors 50 and 69 and the driving means carried thereby without interfering with the continuous drive for the elevator conveyor.

The alternate rolls of the elevator conveyor located between those, the driving mechanism for which has just been described, are driven from the right as seen in Fig. 1. For this purpose they are provided at their right-hand ends with bevel gears 155 (Figs. 1, 4 and 5) meshing respectively with bevel gears 156 on a horizontal shaft 157, these parts corresponding respectively with bevel gears 141-142 and shaft 143 above described. The supporting structure for the bearings for shaft 157 corresponds to that above described for shaft 143. Shaft 157 and the gears 156 carried thereby are driven from a short vertical shaft 158 (Figs. 4 and 5) which is mounted in a manner similar to the shaft 147 with the exception that it extends downwardly but a short distance. Shaft 158 is provided at its upper end with a bevel gear 159, shown in dotted lines in Figs. 4 and 5 and meshing with one of the gears 156. Beneath the bearing bracket the shaft 158 is provided with a bevel gear 160 meshing with a bevel gear 161 on a shaft 162 which extends completely through the elevator 101, as seen in Fig. 3, passing through a casing to prevent the loose insulating material within the elevator structure from causing undue friction and retarding its rotation. At its left-hand end, as seen in Figs. 1 and 5, the shaft 162 is provided with a bevel gear 163 (see also Fig. 2), which is adapted to mesh with a bevel gear 164 (Fig. 2) mounted upon the shaft 147, the drive for which has been described above. Thus, it will be seen that all the rollers of the elevator conveyor 138 are positively driven in a continuous manner independently of the vertical movement or position of the elevator.

While the articles are being raised upon the elevator 101 they are prevented from being prematurely moved therefrom by the adjacent wall 216 of the leer structure irrespective of the continued movement of the rolls 139 of the elevator conveyor. When the elevator has been moved upwardly to its uppermost position, however, this wall is no longer in front of the articles and they may be moved from the elevator conveyor and on into the leer.

*Stationary conveyor section for moving articles to leer conveyor*

Means are provided when the elevator is used, as above set forth, for moving articles from the time they are moved off the elevator to a point from which they may be carried through the leer by the leer conveyor. Such means, of course, may take the entire forward space within the leer in the event that the elevator is not used, or it may be considered that the elevator may be located permanently at its uppermost position. In the embodiment of the device here disclosed, however, a conveyor section generally indicated at 165 is provided (see Figs. 1 and 3), this conveyor preferably comprising a plurality of live rolls 166 which, when the elevator is raised, are positioned in prolongation of the elevator conveyor, the rolls extending transversely of the leer and being pivoted at each side therof, as clearly shown in Fig. 5.

Means are provided for driving these rolls, in many respects similar to the driving means for the elevator conveyor, with the exception that it is unnecessary that provision be made for relative vertical movement between the rolls and their driving means. In the embodiment of the invention here shown, alternate rolls are driven from the left-hand side and the remainder from the right-hand side, as indicated in Figs. 1, 2 and 5.

Considering first the rolls driven from the left, these rolls are provided at their left-hand ends, as seen in Figs. 1 and 5, with bevel gears 167 meshing respectively with bevel gears 168 mounted upon a shaft 169 journaled in suitable brackets secured to the frame of the leer. One of the rolls 168 also meshes with a bevel gear 170 secured to the upper end of a vertical shaft 171 journaled in brackets 172 and 173 fixed to suitable parts of the leer. The shaft 171 passes through the gear box 149 and is provided intermediate the upper and lower panels of that box with a sprocket wheel 174 about which the chain 151 passes. As the drive for the chain 151 has already been described, it will be seen that the rolls in question will be driven continuously.

The rolls of the conveyor 165 which are driven from the right-hand side as seen in Fig. 1, are provided at their right-hand ends with bevel gears 175 (Figs. 1 and 5) meshing with bevel gears 176 mounted upon a shaft 177. The shaft 177 is suitably journaled in a bracket 178 secured to the leer 1. One of the gears 176 is adapted to be driven by a bevel gear 179 mounted upon the upper end of a short shaft journaled in a bracket 178a secured to the leer 1, the lower end of this shaft carrying a bevel gear 180 meshing with a bevel gear 181 upon a transverse shaft 182 passing completely through the leer structure and carrying at its other end a bevel gear 183 (Figs. 2 and 5) meshing with a bevel gear 184 secured to the shaft 171. The shaft 182 is protected from contact with the loose heat insulating material within the portion of the leer through which it passes by a suitable shield, as indicated in Fig. 3.

Between the last roll 166 of the conveyor 165 and the leer conveyor 3, a short shelf 185 is provided (Figs. 1 and 3) to bridge the gap between this roll and the leer conveyor. It is to be understood that this bridge is so short that articles will be moved forwardly either by one of the rolls 166 or by the leer conveyor 3, so that there will be no possibility of stoppage at this point.

*Pusher fingers—construction, mounting and operation*

For moving articles of ware from the conveyor 69 into the leer, and in the present instance, onto the elevator 101, I have provided a plurality of pusher fingers which are projectable between the rolls 70 of the conveyor 69, thereafter movable horizontally to move the articles from the conveyor 69 onto the elevator 101, then movable downwardly beneath the plane including the tops of the rollers 70 of the conveyor 69, and thereafter movable back to their initial position.

In the present instance I have shown one of these fingers between each pair of adjacent rolls, although it will be understood that when handling relatively large articles of ware some of the fingers might be dispensed with and possibly fingers between every other roll used, or some other desired arrangement.

The fingers 186 are preferably of the form shown in side elevation in Fig. 3 and are preferably constructed of sheet metal, having their lower ends bent sideways in an L-shape, as indicated in detail in Fig. 6. The fingers 186 are mounted upon a transverse carrier member 187, which is shown as secured to a second transverse member 188, the ends of which are carried in horizontal guideways 189 (see Fig. 3 and at the left in Fig. 5). There are two of these guideways, one located at each side of the structure and formed by suitable metallic members secured to the upper ends of vertical slides 190. These slides are mounted in suitable guideways, one of which is indicated at 191 in Fig. 3, the guideways being secured to the vertical angle members 19 and 20.

Means are provided for moving the fingers vertically, comprising a means for moving the slides 190 up and down, the slides carrying the fingers with them in their vertical movements. This means comprise a pair of levers 192 pivoted intermediate their ends at 193 to the transversely disposed angle 17 of the box 12. The outer lateral ends 194 of the levers 192 abut against the lower sides of adjustable stops 195 secured in brackets 196 rigid with the slides 190 (Fig. 5). Thus, by suitably adjusting the stops 195, the uppermost position of the fingers 186 may be determined as may also the level of the slides 190 and the fingers 186. The levers 192 are both connected by pin and slot connections, shown in dotted lines at 197 (Fig. 5) to a vertical slide 198 mounted in suitable slideways secured to the transverse angle 17 of the box 12. At its lower end, the vertical slide 198 carries a cam roller 199 cooperable with the cam 200 secured to the main drive shaft 45. Thus, it will be seen that motion of the cam roll 199 due to the rotation of the cam 200 will be transmitted into vertical up and down motion of the fingers 186.

In order to counterbalance the weight of the fingers, their carrier members 187 and 188, and the slides 190, the vertical slide 198 is provided with a cross member 201 (Fig. 5), secured thereto and carrying counterbalance weights 202 at either side.

The fingers 186 are moved in a direction longitudinal of the leer (to the right and left as seen in Fig. 3) by double acting cam mechanism synchronized with the other operations of the device. For this purpose the member 187 is provided with depending brackets 203 (Figs. 3, 4 and 6) which are connected by links 204 to the upper ends of levers 205, the lower ends of which are connected to a cross shaft 206 journaled in suitable bearings 207 (Fig. 6) secured to a frame structure 208 rigid with and depending from the box 12. Centrally of the shaft is located a part pinion 209 secured thereto and meshing with a rack 210 formed as a vertical sliding member and mounted for sliding movement in suitable guideways in the lower side of a box 12 (Fig. 3). The rack bar 210 is provided with a pair of cam rolls 211 and 212 (Figs. 3 and 6) which are adapted to be engaged at suitable times by cam surfaces 213 and 214 respectively, these cam surfaces being formed on a member 215 secured to the cam 200 (Figs. 3, 5 and 6.)

In operation the cam surface 213 is adapted to contact with the cam roll 211, depressing the rack bar 210 and causing the clockwise rotation of the shaft 206, as seen in Fig. 3, which causes the fingers 186 to move to the right on their active stroke. At the termination of this active stroke, the cam 200 is so shaped as to permit the fingers 186 to move downwardly. Thereafter the cam surface 214 engages the cam roll 212 to raise the rack bar 210 and retract the fingers 186 away from the leer. At some time prior to the next active stroke of the fingers 186, the cam 200 causes them to be moved upwardly in readiness for their next operation upon the next row of articles.

It will be understood that the relation of parts is such that after a complete row of bottles has been positioned in alignment with the forward end of the tunnel, the fingers 186 will be actuated to move this row onto the elevator 101, which will then be raised and the articles moved therefrom onto the conveyor 165, which in turn will move them onto the leer conveyor 3.

*Front door heat trap for the leer*

In order to prevent ingress of undesirable currents of air into the leer as far as possible and also to minimize heat losses from the interior of the leer and thus render the temperature conditions in the leer more uniform so that the ware may be properly and uniformly annealed, I preferably provide a front door structure indicated here generally at 217. This door is mounted in suitable guideways on either side of the leer as indicated at 218 (Fig. 2). The door 217 may be constructed of structural metal members and sheet metal plates as an exterior casing and have its interior filled with loose pulverulent heat insulating material, such as kieselguhr. The door 217 is preferably provided with a recessed portion 219 (Fig. 3) above the conveyor 69 for permitting the movement of a series of articles therealong, one end of this recessed portion being open for permitting the introduction of such articles, as illustrated in Fig. 2. Another recess 220 is formed in the lower corner of the door (Fig. 3) for accommodating the pushers 186 in their upper retracted position in readiness for their active stroke.

Thus, it will be seen that the front end of the leer is closed with the exception of the lateral opening through which the articles are introduced along the conveyor 69 and at the bottom, which is in effect closed by the conveyor 69. In any event, there are substantially no openings above the level of the leer conveyor 3, so that a minimum of heat will be lost, due to the tendency of heated currents to rise and the only opening through which such currents can rise being at one end through which ware is introduced. Even here, a material part of this opening is located below the level of the leer conveyor. This arrangement is made possible by the use of an elevator device positioned within the leer and inside the front door structure. I am thus enabled to close substantially all openings above the conveyor of the leer as the ware is brought upwardly by the elevator from a lower level to the level of the leer conveyor after it has been brought within the protection of the leer and front door structure. This makes for heat economy on the one hand and for the better control of temperature within the leer on the other, due to almost the complete exclusion of stray currents of air which might otherwise enter the leer, due to wind conditions about the glass factory in which the device may be located. This is an advantage not only from the point of view of conserving heat but makes for a better and more uniform annealing of the glass articles.

Means are provided for raising and lowering the front door 217 when it is desired to obtain access to the interior of the leer tunnel, such means being in effect manual. This means includes a means for counterbalancing the weight of the leer door and for insuring that any raising and lowering which may be done does not change the level of the door and thus cause it to jam in its guideways. For this purpose the leer door structure 217 is provided with depending structural members 221 at either side (Figs. 2 and 3) which have secured adjacent to their bottom portions brackets 222 to which are fastened the ends of sprocket chains 223. These chains pass upwardly over sheaves 224, around guiding rollers 225, and thence around sprocket wheels 226. The sprocket wheels 226 are secured to the opposite ends of a transverse shaft 227, thus insuring that both sprocket wheels will rotate at the same speed. The chains then pass about sheaves 228 and are secured to counterweights 229. The door 217 may be raised and lowered by manually raising and lowering the counterweights 229.

*Alternative form of the device—Figs. 10 to 13 inclusive*

It may in some instances be desirable to supply articles to a leer from more than one forming machine located so as to discharge articles on either side of the forward end of the leer or alternatively from one side or the other. For this reason I have shown an embodiment of my invention adapted for use in a situation of this kind which may receive articles from either or both sides of the forward end of the leer.

The basic construction of the device including this feature is the same as that of the form above described, as are also the main drive, the conveyor 50, the deflector 82, the ware pusher 86 and its operating mechanism, the elevator and elevator conveyor 138, the conveyor 165 and the operating mechanism for these several parts. There is provided, however, a preliminary conveyor generally indicated at 50' corresponding to the conveyor 50 and mounted in the same way except that it is located at the right rather than at the left of the leer, as seen by a comparison of Figs. 1 and 10.

Means are provided for driving the rolls 51' of the conveyor 50' in a manner generally similar to that for the rolls 51 of the conveyor 50 and include a bearing or gear box 52' in which the rolls 51' are mounted and which also houses sprockets on the ends of the rolls 51', double sprocket chains corresponding to the sprocket chains 58 and 59, a shaft 60' corresponding to the shaft 60 and at one side of which is located sprocket chain connection 61' corresponding with the sprocket chain connection 61. The shaft 62' corresponds to the shaft 62 and carries at its inner end a bevel gear corresponding to the gear 63 meshing with a bevel gear corresponding to gear 64 on a drive shaft 65' corresponding generally with the main roller drive shaft 65. In this case, however, the shaft 65' is adapted to be driven by a sprocket and chain connection shown in dotted lines at 230 (Fig. 12) from a short shaft 231 journaled in the gear box 71'. The forward end of this shaft 231 is provided with a bevel gear 232 (Fig. 11) which meshes with a bevel gear 233 on the end of the transverse shaft 234 journaled in suitable bearings on the forward side of the gear box 71'. At its opposite end, the shaft 234 is provided with a bevel gear 235 meshing with a bevel gear 236 on a short shaft 237 journaled in the gear box 71'. The shaft 237 is adapted to be driven from the main roller drive shaft 65 by a sprocket and chain connection 238 (shown in dotted lines in Fig. 12 and in full lines in Fig. 13). Thus, it will be seen that the rollers 51' of the conveyor 50' are continuously driven from the main roller drive shaft 65 as are also the rollers 51 of the conveyor 50.

The transverse conveyor 69' corresponding to the conveyor 69 of Fig. 1 may be considered as comprising two groups of rollers having a dividing line approximately centrally of the transverse dimension of the leer tunnel 2. The rollers of conveyor 69' are constructed, mounted, and supported in the same manner as the rollers 70 of the conveyor 69, and are so arranged at their dividing line that each group may constitute a continuation of the other.

Separate means are provided for driving each of these groups of rollers, as indicated in Figs. 11 and 12. Within the gear box 71' each of the rollers are provided with sprockets corresponding to sprockets 76 above referred to in connection with the rollers 70 of conveyor 69. In this case, however, the sprockets of the left-hand group of rollers, as seen in Fig. 12, are rotated by a pair of conveyor chains indicated at 239 (Fig. 12) which pass over rather than beneath the sprockets and which are also caused to pass about sprocket wheels 240 mounted upon a short shaft 241 journaled in the gear box 71'. Suitable idlers 242 insure the engagement of the sprocket chains 239 and the sprocket wheels 240. The right hand group of rollers, as seen in Fig. 12, are similarly provided with sprocket wheels in two alternate series engageable by a pair of sprocket chains 243 which pass over them, as in the case of sprocket chains 239 and which also pass beneath a pair of sprocket wheels 244, being held in proper engagement therewith by a pair of idler rolls 245. The sprockets 244 are mounted upon a short shaft 246 journaled in the gear casing 71'.

Referring now to Fig. 11, the shafts 241 and 246 are provided at their forward ends with bevel gears 247 and 248 respectively. With each of these gears is cooperable one of the other of pairs of reversing gears splined to the shaft 234 which is driven from the main roller driving shaft 65 as above described. As shown, the gear 247 is engageable by one or another of the bevel gears 249 or 250, these gears being provided with elongate hubs having grooves in which are received the bifurcated ends of the yoke member 251, so that either of the gears 249 or 250 may be alternatively moved into engagement with the bevel gear 247. This may be done by moving the yoke 251 to the left or right, as seen in Fig. 11. This movement is accomplished by means of a lever 252 suitably connected to the yoke 251 and preferably provided with suitable spring detent means (not shown) for holding it in the desired position to retain either of the gears 249 or 250 in meshing engagement with the gear 247. Bevel gear 248 is similarly cooperable with one or the other of the bevel gears 253 and 254 of a reversing mechanism, including a yoke 255 similar to yoke 251 and movable to the right or left to bring one or the other of the gears 253 or 254 into meshing engagement with the gear 248 by means of a hand lever 256, which is preferably similarly provided with a spring detent for insuring its position with one or the other of the gears 253 or 254 in mesh with the gear 248.

Thus, it will be seen that each of the roller sections of the roller conveyor 69' may be operated in either direction so as to move articles of ware from the right or left as may be desired all the way across the leer, or to move articles from both sides toward the mid position.

Pusher means are provided in connection with the conveyor 50' for moving articles therefrom onto the conveyor 69' and comprise a pusher member 86' mounted and operated in a manner similar to that described for the pusher member 86, including the use of an operating lever 88', cam 90', cam roller 94', slide 95', and retracting spring 99' mounted and operating exactly as the similarly numbered parts described above. The cam 90' is mounted upon a shaft 91' which is driven by means of a sprocket and chain 93' from the main shaft 45 in exactly the same manner as that above described in connection with the drive for the pusher 86. The operation and functions of the pusher 86' thus correspond to the operations and functions of the pusher 86 respectively.

When the articles are to be brought to the leer from the right instead of from the left, as above described in connection with Figs. 1 to 9, no change need be made in the synchronized relation between the rollers and pushers, finger and elevator operation, etc. However, when the articles are to be moved from both sides half way into the leer, it is necessary that the rollers be driven only one-half as fast with respect to the pusher fingers 186 and elevator 101 in order that all the parts shall operate in the proper synchronized relation. For this reason there is shown in Figs. 10, 11 and 13 alternatively usable driving connections between the main driving shaft 45 and the main roller driving shaft 65. The main roller driving shaft 65 is for this purpose provided with sprockets 66 and 66' both of the same size. These sprockets are adapted to be driven by chains 67 and 67' respectively, chain 67 passing around sprocket wheel 68, as above described, and chain 67' passing around a smaller sprocket wheel 68' having half the number of teeth of sprocket wheel 68. Any suitable means may be used for engaging the sprocket wheel 68 and 68' alternatively with the main driving shaft 45. I have chosen to show, however, only the simplest of such means, namely, set screws 257 and 258 for sprocket wheels 68 and 68' respectively, so that one of these set screws may be tightened to cause the sprocket wheel associated therewith to rotate with shaft 45 whereas the other may be loosened to permit its associated sprocket wheel to rotate loosely with respect to this shaft.

Thus, when it is desired to feed articles all the way across the leer from either side, sprocket wheel 68 will be secured to the shaft 45 and sprocket wheel 68' permitted to turn with respect thereto, whereas when it is desired to feed articles from both sides only half way across the conveyor 69', sprocket wheel 68' will be secured to shaft 45 and sprocket wheel 68 loosened to permit it to rotate with respect thereto.

Also as illustrated in Fig. 10, articles of various sizes may be moved into the leer from the two sides. For this purpose it is necessary to provide a different synchronized time relation between the operation of the rolls of the conveyors 50, 69' and 50' and of the lateral pushers 86 and 86'. Similar changes may also be necessary in adapting the device shown in Fig. 1 for the handling of articles of different sizes. These changes may be easily and quickly made by making the pusher operating cams 90 and 90' interchangeable with other cams having different numbers of raised portions and/or different configurations. The cams may be interchanged as may be necessary by removably securing them to the shafts 91 or 91'.

While I have shown and described but two embodiments of my invention, it is obvious that many modifications may be made therein, and many of the individual features here illustrated and described may be used in other connections. I do not wish to be limited therefore, except by the scope of the appended claims, which are to be constructed as broadly as the state of the prior art permits.

I claim:

1. Glassware conveying mechanism, comprising a stationary support, power driving means mounted thereon, a ware elevator forming a part of the conveying mechanism, live rolls forming the ware-contacting floor of said elevator, and power transmission mechanism for imparting continuous driving motion from said power driving means to said live rolls, including a shaft mounted for movement with said elevator and with its axis parallel to the path of movement thereof, a driving wheel splined to said shaft but not partaking of the axial movement thereof incident to movement of said elevator, means to drive said wheel continuously from said power driving means, and means for imparting rotative driving movement to said live rolls from said shaft.

2. Glassware conveying mechanism including a conveying means at a lower level, a conveying means at a higher level, an elevator for receiving articles of glassware from one of said conveying means and moving such articles to the level of the other of said conveying means by a movement in a substantially vertical direction, means for raising and lowering said elevator, and means for adjustably determining the uppermost limit of the travel of said elevator and for insuring that the elevator is level at its uppermost position, the last named means comprising an adjustable length link forming an element of said raising and lowering means, and a pair of fixed but adjustable stops positioned one at each side of said elevator and adapted to be engaged by parts rigid with said elevator when in its uppermost position.

3. Glassware conveying mechanism including a conveying means at a lower level, a conveying means at a higher level, an elevator for receiving articles of glassware from one of said conveying means and moving such articles to the level of the other of said conveying means by a movement in a substantially vertical direction, means for raising and lowering said elevator, and means for adjustably determining the lowermost limit of the travel of said elevator and for insuring that the elevator is level at its lowermost position, the last named means comprising a lost motion mechanism forming a part of said raising and lowering means, levers adapted to be rocked on their fulcrums by the elevator when approaching its lowermost position and located one at each side of the elevator, and a pair of adjustable stops interposed respectively between said levers and fixed parts of the structure.

4. Glassware conveying mechanism including a conveying means at a lower level, a conveying means at a higher level, means for adjustably determining the level of one of said conveying means an elevator for receiving articles of glassware from one of said conveying means and moving such articles to horizontal alignment with the other of said conveying means by a movement in a substantially vertical direction, means for raising and lowering said elevator, and means for adjustably determining the uppermost and lowermost positions of movement of said elevator, the last named means including a means which automatically compensates for any adjustment which may be made in the level of the adjustable level conveying means.

5. Apparatus for stacking articles of glassware onto the conveyor of a glassware annealing leer, comprising a transverse conveyor disposed adjacent to the forward end of the leer, means for operating said conveyor continuously and at a predetermined speed, an elevator extending completely across the forward end of said leer and contiguous to said transverse conveyor, means for pushing articles of glassware from said transverse conveyor onto said elevator, means for operating the last named means in synchronized time relationship with the driving means for said transverse conveyor, conveyor means forming the ware contacting surface of said elevator, and means for driving the elevator-conveyor means continuously independently of the position and movement of said elevator, whereby the elevator-conveyor means is operative to move the articles of glassware across the width of said elevator and onto the leer conveyor when the elevator has been moved vertically to a position such that the elevator-conveyor means may operate to move the articles from the elevator to the leer conveyor.

6. Apparatus for moving articles of glassware from one level and stacking them upon the conveyor of a glass annealing leer which is located at another level, comprising a transverse conveyor disposed across the ware-entering end of the leer, a plurality of live rolls forming the ware contacting surface of said transverse conveyor, means for continuously driving said live rolls, an elevator arranged across the front end of the leer contiguous to said transverse conveyor and adapted in one position to receive articles of glassware therefrom, pusher means for moving the articles of glassware from the transverse conveyor onto said elevator, means for operating said pusher means in synchronized time relation with the drive means for the live rolls of said transverse conveyor, a plurality of live rolls forming the ware contacting surface of said elevator and arranged with their longitudinal axes transverse of the leer, means for driving the live rolls of the elevator conveyor continuously independently of the position or movement of said elevator, and means for raising and lowering said elevator to move it in a substantially vertical direction between a position to receive ware from said transverse conveyor and a position where the live rolls of the elevator may operate to move the ware therefrom and toward the leer conveyor.

7. Apparatus for moving articles of glassware from a lower level and stacking them upon the conveyor of a glass annealing leer which is located at a higher level, comprising a transverse conveyor disposed across the ware-entering end of the leer, a plurality of live rolls forming the ware contacting surface of the transverse conveyor, means for continuously driving said live rolls, an elevator arranged across the front end of the leer contiguous to said transverse conveyor and adapted in its lowermost position to receive articles of glassware therefrom, means for raising and lowering said elevator, a plurality of pusher fingers projectable upwardly between certain at least of the rolls of said transverse conveyor for moving the articles of glassware from this conveyor onto said elevator, means for operating said pusher fingers in synchronized time relation to the drive for the rolls of said transverse conveyor, a plurality of live rolls forming the ware-contacting surface of said elevator, means for driving the elevator rolls continuously independently of the position or movement of the elevator, means for preventing ware from being prematurely moved off said elevator by the continuous rotation of the rolls of the elevator conveyor, a live roll conveyor in substantially horizontal alignment with the uppermost position of said elevator and contiguous thereto, means for driving the rolls of the last named conveyor for receiving articles of glassware from the elevator rolls and moving such articles in a direction longitudinally of the leer and toward the leer conveyor, and a bridging device disposed between the last of the live rolls of said last named conveyor and the leer conveyor.

8. The combination with a tunnel leer for annealing glassware having conveyor means for moving articles of glassware therethrough, of a stacker means for moving such articles from a position at one side and in front of the ware-entering end of the leer tunnel and including a conveyor disposed transversely of the forward end of the leer tunnel, means for operating said conveyor continuously and at a predetermined speed, an elevator extending completely across the forward end of the leer tunnel and arranged contiguous to the transverse conveyor, means for pushing articles of glassware from the transverse conveyor onto said elevator, means for operating said pushing means in synchronized time relationship with the driving means of said conveyor, means for raising said elevator with the articles of glassware thereon from the level of the transverse conveyor to a higher level within the leer and for returning the elevator to its lower position after the glass articles have been moved therefrom, conveyor means forming the ware-contacting means of said elevator, and means for driving the elevator conveyor means continuously independently of the position and movement of said elevator, and a front door structure for the leer tunnel adapted completely to close said tunnel at its forward end with the exception of the lateral space through which the transverse conveyor moves the articles into longitudinal alignment with the leer tunnel and the lower portion occupied by the transverse conveyor, whereby to form a heat trap at the forward end of said leer tunnel substantially to prevent the entry of harmful currents of air and substantially to prevent the egress of heated tunnel atmosphere from the interior of the leer tunnel.

9. The combination with a tunnel leer for annealing glassware having conveyor means for moving the glass articles therethrough, of a stacker means to move such articles to desired position upon the leer conveyor, a front door structure for the ware-entering end of the leer tunnel open at its bottom at a level beneath that of the leer conveyor and having at least one lateral opening large enough for one article at a time to be moved therethrough, said opening being arranged with a substantial part thereof below the level of the leer conveyor means, said stacker means including a transverse conveyor for moving the articles beneath said front door structure in a direction transverse of the leer, means operative then to move the articles in a direction longitudinally of the leer, means operative thereafter to move the articles in a substantially vertical direction at least up to the level of the leer conveyor, and means operable thereafter to move the articles in a direction longitudinally of the leer and onto the leer conveyor, whereby the front door structure cooperates with the forward end of the leer tunnel and said stacker means to form a heat trap for minimizing heat losses from the leer at the forward end and for minimizing harmful in-drafts at the forward end of the leer, while permitting the continuous automatic loading of the leer with articles to be annealed.

10. The combination with a tunnel leer for annealing glassware having conveyor means for moving glass articles therethrough, of a stacker means to move such articles to desired position upon the leer conveyor, a front door structure for the ware-entering end of the leer tunnel open at its bottom at a level substantially beneath the level of the leer conveyor, means inwardly of the leer from the front wall of said front door structure to elevate ware to be annealed from a lower level to a level at least as high as that of the leer conveyor, and means to move articles of ware from the elevating means onto the leer conveyor, whereby the front door structure forms with the ware-entering end of the leer tunnel a heat trap for minimizing heat losses from the leer and harmful in-drafts of air into the leer tunnel, while permitting the continuous automatic loading of the leer with articles to be annealed.

11. Glassware handling mechanism, comprising a roller conveyor, bearing devices for the rolls of said conveyor located wholly to one side of the ware-contacting portions of said rolls, and means for moving articles from said conveyor in a direction substantially perpendicular to their direction of movement therealong, the last-named means comprising a plurality of pusher members extensible upwardly between certain at least of said rolls and also movable in directions parallel to the axes of said rolls, and means for moving said pusher members in paths having active portions in which the upper ends of said pusher members extend above a plane including the tops of said rolls and inactive portions in which the top ends of said pusher members are below said plane.

12. Glassware handling mechanism, comprising a roller conveyor, bearings for the rolls of said conveyor located wholly to one side of the ware-contacting portions of said rolls, and means for moving articles from said conveyor in a direction substantially perpendicular to their direction of movement therealong, the last named means comprising a plurality of pusher fingers one of which is extensible upwardly between each adjacent pair of said rolls and all of which are movable also in directions parallel to the axes of said rolls, means for supporting said pusher fingers for movement in unison, means for moving said pusher fingers vertically to project them upwardly prior to the beginning of their active stroke and to retract them downwardly after the termination thereof, and other means for moving said pusher fingers in directions parallel to the axes of said rolls.

13. Glassware handling mechanism, comprising a roller conveyor, bearing devices for the rolls of said conveyor located wholly to one side of the ware-contacting portions of said rolls, and means for moving articles from said conveyor in a direction substantially perpendicular to their direction of movement therealong, the last named means comprising a plurality of pusher fingers one of which is extensible upwardly between each adjacent pair of said rolls and all of which are movable also in directions parallel to the axes of said rolls, means for supporting said pusher fingers for movement in unison, a pair of vertically movable slides having horizontal guideways thereon in which the supporting structure for the pusher fingers is mounted, cam means for moving said slides and pusher fingers vertically, the cam for operating said means having a configuration such that the pusher fingers are elevated so that their top ends are above the plane of the active surface of said rolls at the beginning of their active stroke and are retracted so that said upper ends are beneath said plane at the end of said active stroke, a second cam mechanism for moving said pusher fingers in directions parallel to the axes of said rolls by movement of said supporting means and said fingers along said horizontal guideways, and means for counterbalancing the weight of the pusher fingers, their supporting means, and said slides.

14. Glassware handling mechanism, comprising a live roller conveyor, bearing devices and driving mechanism for the rolls of said conveyor both located wholly to one side of the ware-contacting portions of said rolls, means for continuously driving said rolls, and means for moving articles from said conveyor in a direction substantially perpendicular to their direction of movement therealong, the last named means comprising a plurality of pusher fingers extensible upwardly between certain at least of said rolls and also movable in directions parallel to the axes of said rolls, and means synchronized with the continuous driving means for said rolls for moving said fingers in cyclical paths including an upward movement adjacent to the bearing ends of said rolls, a substantially horizontal movement away from such ends, a downward movement to move the upper ends of the pusher fingers beneath the plane of the active surface of said rolls, and a substantially horizontal retractive movement to complete their cycle of movement.

15. Means for stacking articles of glassware onto the conveyor of a glassware annealing leer, comprising transverse conveyor mechanism including two sections each extending substantially to the middle of the leer tunnel, one of said sections being arranged to move articles from a point adjacent to one side of the leer toward the center thereof and the other being adapted alternatively to move articles from the other side of the leer toward the center or to move articles from the center toward the said other side in prolongation of the first conveyor section, separate means for driving each section of said conveyor, the driving means for the second named conveyor section being such that the conveyor section may be driven in either direction, means for moving articles from both sections of the transverse conveyor means onto the leer conveyor, and means for synchronizing the time relationship between the movements of the sections of the conveyor and the means for moving articles therefrom to the leer conveyor including speed changing means for causing one relative time relationship when the two conveyor sections are operated in the same direction and for causing a predetermined different relative time relationship when the two conveyor sections are operating in opposite directions.

16. Apparatus for stacking articles of glassware upon the conveyor of a tunnel-type glassware annealing leer, comprising transversely disposed conveyor means adjacent to the ware-entering end of the leer and including two conveyor sections, the line of division of which is substantially midway of the transverse dimension of the leer tunnel, means for driving each of the transverse conveyor sections alternatively in either direction, whereby ware may be conveyed from either side of the leer all the way across in either direction or from both sides half way across the width of the leer tunnel, means for moving articles of glassware from the transverse conveyor means onto the leer conveyor, and means for synchronizing the operation of the last named means with the drive for said transverse conveyor means in such a manner that said last named means will operate at twice the speed with respect to the conveyor driving means when the transverse conveyor sections are operating from both sides toward the center as compared with the speed of said last named means when said transverse conveyor sections are operating to move ware from either side all the way to the opposite side.

17. Means for stacking articles of glassware onto the conveyor of a continuous tunnel type glassware annealing leer, comprising a transverse conveyor of the live roll type including two sections of rolls, one of said sections being arranged to move articles from a point adjacent to one side of the leer toward the center thereof and the other being adapted alternatively to move articles from the other side of the leer toward the center or to move articles from the center toward said other side in prolongation of the first conveyor section, unidirectional driving means for the rolls of both sections of said transverse conveyor, a reversing mechanism interposed between said driving means and the rolls of the second named conveying section, whereby the rolls of this section may be driven alternatively in either direction, means for moving articles from both sections of the transverse conveyor onto the leer conveyor, and means for driving the last named means in synchronism with the roll driving means alternatively at two different relative speeds, one for use when both sections of the conveyor means are operating in the same direction and the second in which the article moving means operates at twice the speed for use when the sections of said transverse conveyor are operating to move articles in opposite directions.

18. Apparatus for stacking articles of glassware upon the conveyor of a continuous tunnel type of glassware annealing leer, comprising a transverse conveyor of the live roll type adjacent to the ware-entering end of the leer and including two conveyor sections, the line of division of which is substantially midway of the transverse dimension of the leer tunnel, unidirectional driving means for the rolls of both sections, reversing means interposed between said driving means and the rolls of each section respectively, whereby the rolls of each section are movable alternatively in opposite directions, and whereby ware may be conveyed from either side of the leer all the way across in either direction or from both sides half way toward the center, means including pusher fingers operable between the rollers of both sections for moving articles of glassware from the transverse conveyor means in the direction longitudinal of the leer, means for operating said pusher fingers from said unidirectional driving means, and alternatively usable power transmission means between said unidirectional driving means and said rolls for effecting a one-half speed reduction for said rolls in the event that the two sections of said transverse conveyor are operated in opposite directions to move ware from both sides toward the center, whereby the operation of the pusher fingers will be synchronized with the speed of operation of the rolls under all conditions of use.

Signed at Fairmont, W. Va., this 13th day of February 1932.

ORIE SHACKELFORD.